(12) United States Patent
Lockhart et al.

(10) Patent No.: US 7,396,875 B2
(45) Date of Patent: Jul. 8, 2008

(54) UV-CURABLE WATERBORNE POLYURETHANE DISPERSIONS FOR SOFT TOUCH COATINGS

(75) Inventors: Aaron A. Lockhart, North Versailles, PA (US); Michael J. Dvorchak, Monroeville, PA (US); Lyubov K. Gindin, Pittsburgh, PA (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 796 days.

(21) Appl. No.: 10/761,015

(22) Filed: Jan. 20, 2004

(65) Prior Publication Data

US 2004/0259970 A1    Dec. 23, 2004

Related U.S. Application Data

(63) Continuation-in-part of application No. 10/600,013, filed on Jun. 20, 2003, now abandoned.

(51) Int. Cl.
*C08G 18/00* (2006.01)
*C08G 18/02* (2006.01)
*C08G 18/12* (2006.01)
*C08G 18/32* (2006.01)
*C08F 2/46* (2006.01)

(52) U.S. Cl. ............... 524/840; 524/589; 524/590; 524/591; 524/839; 524/507; 525/123; 525/455; 522/90; 522/96; 522/84; 522/85; 522/86; 528/44; 528/52; 528/59; 528/65; 528/66; 528/76; 528/81; 528/83; 528/85

(58) Field of Classification Search ................. 524/589, 524/590, 591, 839, 840, 507; 525/123, 455; 522/90, 96, 84, 85, 86; 528/44, 52, 59, 65, 528/66, 76, 81, 83, 85

See application file for complete search history.

(56) References Cited

U.S. PATENT DOCUMENTS

| | | | |
|---|---|---|---|
| 5,135,963 A | 8/1992 | Haeberle | 522/84 |
| 5,684,081 A | 11/1997 | Dannhorn et al. | 524/507 |
| 6,011,078 A | 1/2000 | Reich et al. | 522/86 |
| 6,207,744 B1 * | 3/2001 | Paulus et al. | 524/507 |
| 6,211,286 B1 | 4/2001 | Schafheutle et al. | 524/591 |
| 6,254,937 B1 | 7/2001 | Schafheutle et al. | 427/388.2 |
| 6,335,397 B1 | 1/2002 | Kokel et al. | 524/507 |
| 6,414,079 B1 | 7/2002 | Schafheutle et al. | 524/589 |
| 6,436,540 B1 | 8/2002 | Garcia et al. | 428/423.1 |
| 6,521,702 B1 | 2/2003 | Weikard et al. | 524/839 |
| 6,538,046 B1 | 3/2003 | Paulus et al. | 522/173 |
| 6,541,536 B2 | 4/2003 | Weikard et al. | 522/84 |
| 2002/0137828 A1 | 9/2002 | Ruggiero et al. | 524/376 |
| 2002/0147253 A1 | 10/2002 | Kita et al. | |
| 2003/0162892 A1 | 8/2003 | Maier et al. | 524/839 |

FOREIGN PATENT DOCUMENTS

DE    40 31 732    4/1992

* cited by examiner

*Primary Examiner*—Sanza L McClendon
(74) *Attorney, Agent, or Firm*—Noland J. Cheung; Robert S. Klemz

(57) ABSTRACT

The present invention is directed to a waterborne, UV-curable polyurethane emulsion and the use thereof in producing soft touch coatings. The emulsion is prepared by a) reacting specified hydroxy-functional components with di- and/or polyisocyanates, b) forming a dispersion of the resultant product with water and reacting the dispersion with amine functional materials.

14 Claims, No Drawings

UV-CURABLE WATERBORNE POLYURETHANE DISPERSIONS FOR SOFT TOUCH COATINGS

CROSS-REFERENCE TO RELATED APPLICATION

This application is a Continuation-In-Part of U.S. Ser. No. 10/600,013, filed on Jun. 20, 2003, now abandoned.

BACKGROUND OF THE INVENTION

Waterborne polyurethane dispersions have been used in many applications because of their zero/low-VOC and drying characteristics. This technology is based on the preparation of high molecular weight particles of polyurethane polymers in water. As the water leaves the applied coating, these particles coalesce, forming a non-cross-linked finished film. The performance of these coatings is generally-inferior to one- or two-component cross-linked films in terms of chemical resistance and mechanical durability, particularly in so-called "soft-touch" coatings. One variation of this technology makes use of the preparation of these waterborne polyurethane dispersions with an excess of hydroxyl groups for use in conventionally curing one- and two-component crosslinked coatings. These two types of waterborne polyurethane dispersions can be combined together with water reducible polyisocyanates to form two-component waterborne soft touch coatings with improved general performance. These coatings typically require forty-five minute cure cycles before any properties can be developed (usually fifteen minutes at ambient temperature and thirty minutes at elevated temperatures.

Typical of the prior art, waterborne dispersions used for soft touch coatings are described in U.S. Pat. Nos. 6,211,286, 6,254,937, and 6,414,079, and in U.S. Application Publications 2002/0137828 and 2002/0147253.

Radiation curable polyurethane coating compositions are also known (see, e.g., U.S. Pat. Nos. 5,135,963, 6,011,078, 6,207,744, 6,335,397, 6,436,540, and 6,538,046, and German Published Application 40 31 732.

Finally, radiation curable, waterborne polyurethane dispersions based at least in part on unsaturated polyesters and/or polyester acrylates are also known (see, e.g., U.S. Pat. Nos. 5,684,081 and 6,521,702).

In spite of all the known technology, the art has not yet described a composition for use in soft touch coatings that cure relatively rapidly and form films having a soft feel, good chemical resistance, hydrolytic stability and toughness (i.e., flexibility and mechanically durable).

DESCRIPTION OF THE INVENTION

The present invention is directed to a radiation-curable, aqueous polyurethane emulsion prepared by a process comprising:

A) reacting
1) at least about 5% by weight of an hydroxy group containing, unsaturated polyester acrylate having an OH number of from about 40 to about 200,
2) at least about 5% by weight of a polycarbonate diol having an OH number of from about 28 to about 225,
3) from 0 to about 30% by weight of a polyether diol having an OH number of from about 28 to about 225, with the proviso that if component 3) is present, the weight ratio of component 2) to component 3) is from about 0.5:1 to about 25:1,
4) from 0 to about 10% by weight of a monohydroxy hydrophilic polyether,
5) from about 0.1 to about 20% by weight of one or more mono- or difunctional isocyanate-reactive compounds that contain moieties selected from cationic groups, anionic groups, potential cationic groups and potential anionic groups, with
6) from about 10 to about 50% by weight of one or more diisocyanates and/or polyisocyanates, B) optionally converting any potential cationic or anionic groups into cationic or anionic groups by salt formation, and C) forming a dispersion of the reaction product of 1), 2), 3), 4), 5) and 6) in water and reacting said dispersion with
7) from about 0.1 to about 10% by weight of one or more diamines and/or polyamines, wherein the weight percents of components 1) through 7) total 100% and the equivalent ratio of the isocyanate groups in component 6) to the sum of the isocyanate-reactive groups in component 1), 2), 3), 4) and 5) is from about 1.2:1 to about 2.0:1.

The resultant coatings cure relatively rapidly and form films having a soft feel, good chemical resistance, hydrolytic stability and toughness.

The hydroxyl group-containing unsaturated polyester acrylates (component A)1)) useful herein have OH numbers of from about 40 to about 200, preferably from about 100 to about 200 and most preferably from about 125 to about 180. To prepare the hydroxy-functional polyester acrylates, typically, a total of 7 groups of monomer constituents are used:

a) (Cyclo)alkanediols such as dihydric alcohols containing (cyclo)aliphatically bound hydroxyl groups. Examples include ethanediol; 1,2- and 1,3-propanediol; 1,2-, 1,3- and 1,4-butanediol; 1,5-pentanediol; 1,6-hexanediol; neopentyl glycol; cyclohexane-1,4-dimethanol; 1,2- and 1,4-cyclo-hexanediol; 2-ethyl-2-butylpropane-diol; 2-methy-propane-1,3-diol; diols containing ether oxygen, such as diethylene glycol, triethylene glycol, tetraethylene glycol, dipropylene glycol, tripropylene glycol, polyethylene, polypropylene or polybutylene glycols. Reaction products of the afore-mentioned diols with ε-caprolactone or other lactones may likewise be employed as diols.

b) Alcohols with a hydroxy functionality of three or more. Examples include glycerol; trimethylolpropane; pentaerythritol; dipentaerythritol; and sorbitol; or polyethers prepared starting from these alcohols (such as the reaction product of 1 mol of trimethylolpropane with 4 mol of ethylene oxide).

c) Monoalcohols such as ethanol, 1- and 2-propanol, 1- and 2-butanol, 1-hexanol, 2-ethylhexanol, cyclohexanol and benzyl alcohol.

d) Dicarboxylic acids and/or their anhydrides. Examples include phthalic acid, phthalic anhydride, isophthalic acid, tetrahydrophthalic acid, tetrahydrophthalic anhydride, hexahydrophthalic acid, hexahydrophthalic anhydride, cyclohexane dicarboxylic acid, maleic anhydride, fumaric acid, malonic acid, succinic acid, succinic anhydride, glutaric acid, adipic acid, pimelic acid, suberic acid, sebacic acid, dodecanedioic acid, and hydrogenated dimer fatty acids.

e) Higher polyfunctional carboxylic acids and/or their anhydrides, such as trimellitic acid and trimellitic anhydride.

f) Monocarboxylic acids, such as benzoic acid, cyclohexane-carboxylic acid, 2-ethylhexanoic acid, caproic acid, caprylic acid, capric acid, lauric acid, natural and synthetic fatty acids.

g) Acrylic acid, methacrylic acid and/or dimeric acrylic acid.

Suitable hydroxyl-containing polyester acrylates are prepared by reacting at least one constituent from group a) or b) with at least one constituent from group d) or e) and at least one constituent from group g).

Where desired, groups with a dispersing action (which are generally known in the art) can also be incorporated into these polyester acrylates. For instance, as the alcohol component, it is possible to make proportional use of polyethylene glycols and/or methoxy polyethylene glycols. Examples of compounds that may be mentioned include alcohol-derived polyethylene glycols, polypropylene glycols and the block copolymers thereof.

Furthermore, it is possible, after the esterification, to react some carboxyl groups, especially those of the (meth)acrylic acid, with mono-, di- or polyepoxides. Preferred epoxides (glycidyl ethers) are, for example, those of monomeric, oligomeric or polymeric bisphenol A, bisphenol F, hexanediol and/or butanediol and/or their ethoxylated and/or propoxylated derivatives. This reaction may be used in particular to raise the OH number of the polyester (meth)acrylate, since one OH group is formed in each epoxide-acid reaction. The reaction is preferably catalyzed by catalysts such as triphenylphosphine, thiodiglycol, ammonium and/or phosphonium halides and/or zirconium or tin compounds such as tin(II) ethylhexanoate.

The preparation of polyester acrylates is known and described in U.S. Pat. No. 4,206,205, German Patents 4,040,290 and 3,316,592 and in P. K. T. Oldring (Ed.), Chemistry & Technology of UV & EB Formulations For Coatings, Inks & Paints, Vol. 2, 1991, SITA Technology, London, pp. 123-135.

As the unsaturated polyester, it is also possible to use hydroxyl-containing epoxy (meth)acrylates having the required OH numbers. Such compounds are described in P. K. T. Oldring (Ed.), Chemistry & Technology of UV & EB Formulations For Coatings, Inks & Paints, Vol. 2, 1991, SITA Technology, London pp. 37-56. As is known in the art, hydroxyl-containing epoxy (meth)acrylates are based by reacting acrylic acid and/or methacrylic acid with epoxides (glycidyl compounds) of monomeric, oligomeric or polymeric bisphenol A, bisphenol F, hexanediol and/or butanediol or their ethoxylated and/or propoxylated derivatives.

The hydroxyl group containing unsaturated polyester acrylate is used in an amount of at least 5% by weight and preferably in an amount of from about 5 to about 45% by weight and most preferably from about 20 to about 30% by weight.

The polycarbonate diols (component A)2)) useful herein have OH numbers of from about 28 to about 225, preferably from about 28 to about 75 and most preferably from about 35 to about 65. The polycarbonate diols are esters of carbonic acid obtained by the reaction of carbonic acid derivatives (such as, e.g., diphenyl carbonate, dimethyl carbonate or phosgene) with diols. Examples of useful diols include ethanediol; 1,2- and 1,3-propanediol; 1,2-,1,3- and 1,4-butanediol; 1,5-pentanediol; 1,6-hexanediol; neopentyl glycol; cyclohexane-1,4-dimethanol; 1,2- and 1,4-cyclohexanediol; 2-ethyl-2-butylpropanediol; 2-methy-propane-1,3-diol; diols containing ether oxygen, such as diethylene glycol, triethylene glycol, tetraethylene glycol, dipropylene glycol, tripropylene glycol, polyethylene, polypropylene or polybutylene glycols; bisphenol A; and tetrabromo bisphenol A. U.S. Pat. No. 5,141,987 and German Patents 1,770,245, 1,570,540 and 3,717,060 describe various useful polycarbonate diols.

The polycarbonates should be substantially linear, although they may be slightly branched. Such branching is possible by using relatively small amounts of polyhydroxyl compounds in preparing the poly-carbonates. Such polyhydroxyl compounds included gylcerol, trimethylol-propane, hexane triols, butane triols, pentaerythritol and the like.

The polycarbonate diol is used in an amount of at least 5% by weight and preferably in an amount of from about 5 to about 60% by weight and most preferably from about 30 to about 40% by weight.

The polyether diols useful herein (component A)3)) are generally known in the polyurethane coating art. Useful diols have OH numbers of from about 28 to about 225, preferably from about 28 to 75 and most preferably from about 35 about 65. Suitable polyether diols are prepared by polymerizing cyclic ethers or by reacting alkylene oxides with a starter molecule. Typical starter molecules include ethanediol; 1,2- and 1,3-propanediol; 1,2-, 1,3- and 1,4-butanediol; 1,5-pentanediol; 1,6-hexanediol; neopentyl glycol; cyclohexane-1,4-dimethanol; 1,2- and 1,4-cyclohexanediol; 2-ethyl-2-butylpropanediol; 2-methy-propane-1,3-diol; and diols containing ether oxygen, such as diethylene glycol, triethylene glycol, tetraethylene glycol, dipropylene glycol, and tripropylene glycol. Useful alkylene oxides include ethylene oxide and propylene oxide.

The polyether diols are used in amounts of from 0 to about 30% by weight, preferably in an amount of from about 10 to about 20% by weight and most preferably from about 10 to about 15% by weight. When a polyether diol is used, the weight ratio of component A)2) to component A)3) is from about 0.5:1 to about 25:1, preferably from about 3:1 to about 5:1 and most preferably from about 3:1 to about 4:1.

Useful monohydroxy hydrophilic polyethers (component A)4)) are those having number average molecular weights of from about 1500 to about 2500 and preferably from about 1250 to about 2400. Such monohydroxy compounds include monohydric polyalkylene oxide polyether alcohols containing on average from 5 to 70, preferably from 7 to 55, ethylene oxide units per molecule, as are obtainable conventionally by alkoxylating suitable starter molecules (e.g., in Ullmanns Encyclopädie der technischen Chemie, 4th edition, Volume 19, Verlag Chemie, Weinheim pp. 31-38). Examples of suitable starter molecules included saturated monoalcohols such as methanol, ethanol, n-propanol, isopropanol, n-butanol, isobutanol, sec-butanol, the isomers pentanols, hexanols, octanols and nonanols, n-decanol, n-dodecanol, n-tetradecanol, n-hexadecanol, n-octadecanol, cyclohexanol, the isomeric methyl-cyclohexanols or hydroxymethylcyclohexane, 3-ethyl-3-hydroxy-methyloxetane or tetrahydrofurfuryl alcohol, diethylene glycol monoalkyl ethers (such as, for example, diethylene glycol monobutyl ether), unsaturated alcohols such as allyl alcohol, 1,1-dimethylallyl alcohol or oleyl alcohol, aromatic alcohols such as phenol, the isomeric cresols or methoxyphenols, araliphatic alcohols such as benzyl alcohol, anisyl alcohol or cinnamyl alcohol, secondary monoamines such as dimethylamine, diethylamine, dipropylamine, diisopropylamine, dibutylamine, bis(2-ethylhexyl)amine, N-methyl- and N-ethyl-cyclohexy-lamine or dicyclohexy-lamine and also heterocyclic secondary amines such as morpholine, pyrrolidine, piperidine or 1H-pyrazole. Preferred starter molecules are saturated monoalcohols.

Alkylene oxides suitable for the alkoxylation reaction are, in particular, ethylene oxide and propylene oxide, which can be used in any order or else in a mixture for the alkoxylation reaction. The polyalkylene oxide polyether alcohols are either pure polyethylene oxide polyethers or mixed polyalkylene oxide polyethers at least 30 mol % preferably at least 40 mol % of whose alkylene oxide units are composed of ethylene oxide units.

The monohydroxyl hydrophilic polyether is used in an amount of form 0 to about 10% by weight, preferably in an amount of from about 2 to about 8% by weight and most preferably from about 3 to about 5% by weight.

Component A)5) contains ionic or potentially ionic groups, which may be either cationic or anionic in nature, and contains one or two isocyanate-reactive groups. Cationically and anionically dispersing compounds are those containing, for example, sulfonium, ammonium, phosphonium, carboxylate, sulfonate, phosphonate groups or the groups which can be converted by salt formation into the aforementioned groups (potentially ionic groups), and can be incorporated into the macromolecules by isocyanate-reactive groups that are present. Preferred isocyanate-reactive groups are hydroxyl groups and amine groups.

Suitable ionic or potentially ionic compounds include, for example, mono- and dihydroxycarboxylic acids, mono- and diaminocarboxylic acids, mono- and dihydroxysulfonic acids, mono- and diaminosulfonic acids and also mono- and dihydroxyphosphonic acids or mono- and diamino-phosphonic acids and their salts. Specific useful compounds include dimethylolpropionic acid, dimethylolbutyric acid, hydroxypivalic acid, N-(2-aminoethyl)-β-alanine, 2-(2-aminoethylamino)ethanesulfonic acid, ethylenediame-propyl- or butylsulfonic acid, 1,2- or 1,3-propylenediamine-β-ethylsulfonic acid, citric acid, glycolic acid, lactic acid, glycine, alanine, taurine, lysine, 3,5-diaminobenzoic acid, an adduct of IPDI and acrylic acid (see, e.g., European Patent 916,647) and its alkali metal and/or ammonium salts; the adduct of sodium bisulfite with but-2-ene-1,4-diol, polyethersulfonate, the propoxylated adduct of 2-butenediol and NaHSO$_3$, described for example in German Patent 2,446,440). Preferred ionic or potential ionic compounds are those possessing carboxyl or carboxylate and/or sulfonate groups and/or ammonium groups. More preferred ionic compounds are those containing carboxyl and/or sulfonate groups as anionic or potentially ionic groups, such as the salts of N-(2-aminoethyl)-β-alanine, of 2-(2-aminoethylamine)ethanesulfonic acid; the adduct of IPDI and acrylic acid; or dimethylolpropionic acid.

The ionic/potentially ionic compound is used in an amount from about 0.1 to about 20% by weight, preferably from about 1 to about 8% by weight and most preferably from about 2 to about 4% by weight.

Useful isocyanates (component A)6)) include aromatic, araliphatic, aliphatic or cycloaliphatic polyisocyanates. It is also possible to use mixtures of such polyisocyanates. Examples of suitable polyisocyanates include butylene diisocyanate; hexamethylene diisocyanate (HDI); isophorone diisocyanate (IPDI); 2,2,4 and/or 2,4,4-trimethylhexamethylene diisocyanate; the isomeric bis(4,4'-isocyanato-cyclohexyl)methanes or their mixtures of any desired isomer content; isocyanatomethyl-1,8-octane diisocyanate; 1,4-cyclohexylene diisocyanate; 1,4-phenylene diisocyanate; 2,4- and/or 2,6-tolylene diisocyanate; 1,5-naphthylene diisocyanate; 2,4'- or 4,4'-diphenylmethane diisocyanate; triphenylmethane 4,4',4"-triisocyanate; or derivatives thereof having a urethane, isocyanurate, allophanate, biuret, uretdione and/or iminooxadiazinedione structure, and mixtures thereof. It is preferred to use diisocyanates only with hexamethylene diisocyanate, isophorone diisocyanate and the isomeric bis(4, 4'-isocyanatocyclohexyl)methanes, and mixtures thereof, being particularly preferred.

The isocyanate is used in an amount of from about 10 to about 50% by weight, preferably in an amount of from about 10 to about 30% by weight and most preferably from about 13 to about 23% by weight.

The equivalent ratio of the isocyanate groups of component A)6) to the sum of the isocyanate reactive groups in components A)1), A)2), A)3), A)4), and A)5) is from about 1.2:1 to about 2.0:1 and preferably from about 1.4:1 to about 1.6:1.

The diamines and/or polyamines (component C)7)) serve to increase the molar mass. Since this reaction takes place in the aqueous medium, the diamines and/or polyamines must be more reactive than water in relation to their reaction with isocyanate groups. Examples include ethylenediamine, 1,6-hexamethylenediamine, isophoronediamine, 1,3-phenylenediamine, 1,4-phenylenediamine, 4,4'-diphenylmethane-diamine, amino-functional polyethylene oxides or polypropylene oxides (such as the Jeffamine resins, D series, available from Huntsman), triethylenetetramine and hydrazine. Ethylene diamine and hydrazine are preferred. The diamines and/or polyamines are used in an amount of from about 0.1 to about 10% by weight, preferably in an amount of from about 0.1 to about 3% by weight and most preferably from about 0.5 to about 2% by weight.

The total weight percents of components A)1), A)2), A)3). A)4), A)5) A)6) and C)7) (i.e., components 1) through 7)) total 100%. As shown in the examples, variations in the amounts of materials can produce coatings with different softnesses and chemical resistance, which will allow for choosing the particular properties desired for any particular application.

The processes known in the art may be used to produce the aqueous emulsion of the present invention. Examples of such processes include emulsifier/shear-force, acetone, prepolymer-mixing, melt-emulsifying, ketimine and spontaneous solids-dispersing processes or processes derived therefrom. A summary of these methods may be found in Methoden der Organischen Chemie, Houben-Weyl, 4$^{th}$ Edition, Volume E20/Part 2, p 1682, Georg Thieme Verlag, Stuttgart, 1987. The acetone process is preferred.

In this process, components A)1) through A)5) are charged to a reactor to prepare an initial solution. A solvent that is miscible with water but inert to isocyanate groups can be added at this stage of after addition and reaction of the isocyanate. Suitable solvents include acetone, methylethyl ketone, butanone, tetrahydrofuran, dioxan, acetonitrile, dipropylene glycol dimethyl ether and 1-methyl-2-pyrrolidone. Furthermore, the known catalysts for accelerating the isocyanate-addition reaction (such as triethylamine, 1,4-diazabicyclo-[2.2.2]-octane, tin dioctoate or dibutyltin dilaurate) can also be charged at the same time. Polyisocyanates (C) are added dropwise to these mixtures. After the desired NCO content has been reached, further reaction is greatly reduced by lowering the temperature as fast as possible. How far the reaction temperature has to be lowered depends upon the reaction partners being used (in particular, the reactivity of the isocyanates) and can be monitored by further tracking of the NCO content of the mixture.

If component A)5) does not contain cationic or anionic groups (as opposed to potentially ionic groups), after reaction of components A)1) through A)6), the potentially ionic groups are converted to salt groups to form the anionic and/or cationic groups. In the case of anionic groups, bases such as ammonia, triethylamine, triethanolamine, potassium hydroxide or sodium carbonate can be used. In the case of cationic groups, dimethyl sulfate, lactic acid, acetic acid or succinic acid can be used.

In a next step, the reaction product of components A)1) through A)6) are either introduced into water which contains the amine component C)7) or a water/amine mixture is stirred into the reaction product. The increase in molecular weight is then effected in a final reaction step by reacting the remaining isocyanate groups with amino groups to form the dispersions according to the invention. The quantity of polyamine, C)7), that is employed depends upon the content of unreacted isocyanate groups. It may be advantageous not to react all of the isocyanate groups that are still available with the amine component, but to convert only a portion of these groups. The unconverted isocyanate groups can then undergo reaction slowly with water.

If desired, any organic solvent present can be distilled off. The emulsions of the invention typically will have a solids content of from about 20 to about 60% by weight, and preferably from about 30 to about 55% by weight.

It is also possible to blend (meth)acrylate terminated urethanes, polyesters, polyethers and/or polycarbonates with the dispersion of the present invention. The (meth)acrylate terminated material is used in an amount of from 0 up to 80% by weight, based on the weight of the solids weight of the dispersions. A particularly preferred amount is from about 10 to about 15% by weight. The (meth)acrylate terminated urethanes, polyesters, polyethers and polycarbonates are produced in a known manner. The urethanes are prepared, e.g., by reacting all the isocyanate groups of a polyisocyanate with a monohydroxy (meth)acrylate. The polyesters, polyethers and polycarbonates can be prepared by reacting all the hydroxy groups of a di- or higher hydroxy polyester, polyether or polycarbonates with (meth)acrylic acid or by transesterifying the di- or higher hydroxy polyester, polyether or polycarbonates with a (meth)acrylate. The resultant products contain no groups reactive with isocyanate groups. Depending upon the reactants chosen, the (meth)acrylate terminated urethanes, polyesters, polyethers and/or polycarbonates can be hydrophobic or hydrophilic. Further details regarding the preparation of (meth)acrylate terminated urethanes, polyesters, polyethers and/or polycarbonates can be found, e.g., U.S. Pat. Nos. 4,188,472; 4,340,497; 4,380,604; 5,362,773; 6,465,539; PCT WO 97/04881 and German Offenlegunschrift 2,914,982.

The emulsions according to the invention can be applied onto a wide range of substrates by conventional techniques including spraying, rolling, blade-coating, pouring, brushing or dipping. After evaporation of the water, the emulsions of the invention result in coatings that are dust-dry to slightly tacky.

Polymerization is then induced by radiation chemistry (UV rays, electron beams, X-rays or gamma rays), UV curing being particularly preferred. The UV curing is triggered in the presence of photo-initiators. A variety of photo-initiators can be used. The usual photo-initiators generate free radicals when exposed to radiation energy. Suitable photo-initiators include aromatic ketone compounds such as benzophenones, alkylbenzophenones, 4,4'-bis(dimethylamino)benzo-phenone (Michler's ketone), anthrone and halogenated benzophenones. Also suitable are acylphosphine oxides such as 2,4,6-trimethylbenzoyl-diphenylphosphine oxide, phenylglyoxylic ester, anthraquinone and its derivatives, benzil ketals and hydroxyalkyl phenones. Specifically useful photo-initiators include 2,2-diethoxyacetophenone; 2- or 3- or 4-bromoacetophenone; 3- or 4-allyl-acetophenone; 2-acetonaphthone; benzaldehyde; benzoin; the alkyl benzoin ethers; benzophenone; benzoquinone; 1-chloroanthra-quinone; p-diacetyl-benzene; 9,10-dibromoanthracene 9,10-dichloro-anthracene; 4,4-dichlorobenzophenone; thioxanthone; iso-propyl-thioxanthone; methylthioxanthone; α,α,α-trichloro-para-t-butyl acetophenone; 4-methoxybenzophenone; 3-chloro-8-nonylxanthone; 3-iodo-7-methoxyxanthone; carbazole; 4-chloro-4'-benzylbenzophenone; fluoroene; fluoroenone; 1,4-naphthylphenylketone; 1,3-pentanedione; 2,2-di-sec.-butoxy acetophenone; dimethoxyphenyl acetbphenone; propiophenone; isopropylthioxanthone; chlorothioxanthone; xanthone; and mixtures thereof. There are several suitable photoinitiators commercially available from Ciba including Irgacure 184 (1-hydroxy-cyclohexyl-phenyl-ketone), Irgacure 819 (bis(2,4,6-trimethylbenzoyl)-phenylphosphineoxide), Irgacure 1850 (a 50/50 mixture of bis(2, 6-dimethoxybenzoyl)-2,4,4-trimethylpentyl-phosphine oxide and 1-hydroxy-cyclohexyl-phenyl-ketone), Irgacure 1700 (a 25/75 mixture of bis(2,6-dimethoxybenzoyl)-2,4,4-trimethylpentyl-phosphine oxide and 2-hydroxy-2-methyl-1-phenyl-propan-1-one), Irgacure 907 (2-methyl-1[4-(methylthio)phenyl]-2-morpholono-propan-1-one), Darocur MBF (a phenyl glyoxylic acid methyl ester) and Darocur 4265 (a 50/50 mixture of bis(2,4,6-trimethylbenzoyl)-phenylphosphineoxide and 2-hydroxy-2-methyl-1-phenyl-propan-1-one). Mixtures of these compounds may also be employed. The foregoing lists are meant to be illustrative only and are not meant to exclude any suitable photoinitiators known to those skilled in the art. Those skilled in the art will know the concentrations at which photoinitiators are effectively employed and generally the concentration will be from about 0.1 to about 10% by weight of components 1) through 7) (and preferably from about 3 to about 7% by weight).

The resultant cured films have i) a soft touch or feel, ii) good chemical resistance, iii) good hydrolytic stability, and good toughness (i.e., flexibility and mechanically durable).

In the examples which follow, the following materials were used:

PES—an unsaturated polyester polyol having an OH number of about 160, prepared from 1 mole of adipic acid, 0.72 moles of trimethylolpropane, 1.9 moles of 1,6-hexane diol and 2 moles of acrylic acid PCD—a polycarbonate diol having an OH number of about 56, and being prepared from 1,6-hexane diol and diphenyl carbonate PPG—a polyoxypropylene diol having an OH number of about 56

MNP—a monohydroxy hydrophilic polyether having a molecular weight of about 2250 and being prepared from diethyleneglycol monobutyl ether, propylene oxide and ethylene oxide (weight ratio of ethylene oxide to propylene oxide about 5.4:1)

DMPA—dimethylol propionic acid

HDI—hexamethylene diisocyanate

IPDI—isophorone diisocyanate

Des W—bis(4,4'-isocyanatocyclohexyl)methane

AAS—the monosodium salt of 2-((2-aminoethyl)amine)

AAS1—a 45% aqueous solution of the monosodium salt of 2-((2-aminoethyl)amine)

EDA—ethylene diamine

HyHy—hydrazine hydrate

HyHy1—a 64% aqueous solution of hydrazine hydrate

Miscellaneous
    BHT—2,6-di-tert-butyl-4-methylphenol
    T-12—dibutyltin dilaurate
    Foamstar I-305—a commercially available defoamer from Cognis Coatings & Inks
    Kathon LX—a commercially available biocide from Rohm & Haas consisting of a mixture of N-methyl-5- chloroisothiazolone, N-methylisothazolone, magnesium dintrate, magnesium dichloride and water Byk-346—a commercially available polyether- modified polydimethyl siloxane wetting/levelling agent from Byk-Chemie Foamex 805—a commercially available defoamer emulsion of a polyether siloxane copolymer from Tego Chemie Acematt TS-100 and Acematt OK-412—commercially available amorphous fumed silicas from DeGussa Disperbyk 190—a commercially available dispersing agent from Byk-Chemie Irgacure 819-DW, Irgacure 819, Irgacure 651 and DarocurTPO—commercially available photoinitators from Ciba In the examples that follow, all parts and percents are by weight unless otherwise indicated.

EXAMPLE 1

To a nitrogen-purged, 3-liter flask equipped with a thermocouple-controlled heating mantel, condenser and stirring blade were added about 78 parts of PPG, about 244 parts of PCD and about 13 parts of MNP. Mixing was initiated and the mixture was heated to 75° C. Then about 23 parts of PES and about 60 parts of HDI were charged to the flask. The reaction mixture was catalyzed with 0.14 parts T-12. The reaction proceeded at 75° C. for about 2 hours and 30 minutes when the % NCO was below the theoretical value at 2.78% (3.09% was theoretical value). About 700 parts of dry acetone were added to the flask and temperature was set at 50° C. Dilution in acetone reduced % NCO of the prepolymer to 0.94% (1.15 theoretical value). Chain extender was added 30 minutes after the acetone addition. The chain extender consisted of a mixture of about 9 parts of MS, about 2 parts of EDA, about 1 part of HyHy1 and about 99 parts of water. The reaction mixture was agitated for 1 hour. About 526 parts of distilled water was added to the flask under high agitation. The distillation process started at 45° C. immediately. 0.10 parts of Foamstar I-305 were added during distillation. The distillation was completed after 1 hour and 20 minutes. About 5 parts of Kathon LX was mixed into the dispersion. Then the dispersion was mixed for 1 hour at room temperature and filtered through a 50 micron filter. The dispersion had pH of 6.73, viscosity of 200 cps (measured by Brookfield viscometer with spindle #3 at 20 rpm), a solids content of 39.9% (measured by Halogen Moisture Analyzer, Mettler Toledo HR73) and mean particle size of 1.3 microns (measured by Laser Scattering Particle Size Distribution analyzer Horiba LA-910).

EXAMPLES 2 THROUGH 11

The materials and amounts thereof used and the various times noted in the general description that follows were as indicated in Table 1.

General process: The PPG, PCD, MNP and DMPA were charged to a nitrogen-purged 3 liter flask equipped with a thermocouple-controlled heating mantel, condenser and stirring blade. The BHT, PES and isocyanate were then added sequentially, 1 drop of T-12 was then added. The reaction proceeded at from 75° C. to 80° C. for the time noted, after which the % NCO was as indicated. Acetone was then added and reduced the % NCO to the theoretical level noted. The chain extender mixture (i.e., AAS1, EDA, HyHy1 and water) was added after the acetone addition at the time noted. The reaction mixture was agitated for the time noted and additional water was then added under high agitation. The distillation process started at about 45° C. In some examples, Foamstar I-305 was added during distillation. The distillation was completed in the time noted. Kathon LX was mixed into the dispersion for 1 hour and filtered through a 50 micron filter. The pH, viscosity, solids content and mean particle size were measured as done in Example 1, with the results as shown in Table 2.

TABLE 1

| | Ex. | | | | | | | | | |
|---|---|---|---|---|---|---|---|---|---|---|
| | 2 | 3 | 4 | 5 | 6 | 7 | 8 | 9 | 10 | 11 |
| PPG, pbw | 456 | 456 | 456 | 456 | 456 | 456 | 457 | 457 | 457 | 457 |
| PCD, pbw | 1302 | 1302 | 1302 | 1302 | 1302 | 1302 | 285 | 284 | 285 | 285 |
| MNP, pbw | 159 | 159 | 159 | 159 | 159 | 159 | 159 | 159 | 159 | 159 |
| DMPA, pbw | 48 | 48 | 48 | 48 | 48 | 48 | 48 | 48 | 48 | 48 |
| BHT, pbw | 3 | 3 | 3 | 3 | 3 | 3 | 3 | 3 | 3 | 3 |
| PES, pbw | 922 | 922 | 922 | 922 | 922 | 922 | 1290 | 1291 | 1291 | 1291 |
| HDI, pbw | 695 | 347 | 347 | 695 | 347 | 347 | 642 | 328 | 321 | 321 |
| IPDI, pbw | — | — | 457 | — | — | 457 | — | — | 422 | 422 |
| DesW, pbw | — | 543 | — | — | 543 | — | — | 513 | — | — |
| Time @ 75°-80° C., hrs. | 2.8 | 3.5 | 2.00 | 2.6 | 2.5 | 2.2 | 2.2 | 1.6 | 1.6 | 2.00 |
| % NCO, actual | 3.71 | 3.37 | 3.35 | 3.52 | 3.52 | 3.43 | 3.48 | 3.56 | 3.40 | 3.54 |
| Acetone, pbw | 8250 | 8250 | 8250 | 8250 | 8250 | 8250 | 8250 | 8250 | 8250 | 8250 |
| % NCO, theoretical | 1.12 | 1.1 | 1.11 | 1.12 | 1.1 | 1.11 | 0.95 | 0.99 | 0.94 | 0.94 |
| Time to add, hrs. | 1 | 0.67 | 1.17 | 0.33 | 0.42 | 0.92 | 1 | 1.5 | 0.5 | 0.37 |
| AAS1, pbw | 127 | 132 | 129 | 127 | 133 | 131 | 101 | 108 | 106 | 106 |
| EDA, pbw | 26 | 25 | 26 | 48 | 47 | 47 | 21 | 22 | 20 | 38 |
| HyHy1, pbw | 11 | 11 | 11 | 20 | 20 | 20 | 9 | 9 | 8 | 16 |
| H$_2$O, pbw | 1175 | 1175 | 1175 | 1175 | 1175 | 1175 | 950 | 1020 | 970 | 1300 |
| Time agitated, hrs. | 0.67 | 1 | 0.83 | 0.5 | 1.08 | 1 | 2 | 1 | 0.33 | 1.18 |
| H$_2$O, pbw | 4190 | 4480 | 4350 | 4230 | 4527 | 4396 | 3354 | 3588 | 3489 | 3190 |
| Foamstar I-305, drops | 4 | — | — | 4 | 4 | 4 | 4 | — | — | 4 |
| Time distillation complete, hrs. | 1.08 | 1.08 | 1.33 | 1.63 | 1.2 | 1.42 | 1.33 | 2 | 1 | 1.42 |
| Kathon LX, pbw | 63 | 63 | 63 | 63 | 63 | 63 | 63 | 63 | 63 | 63 |

TABLE 2

| Example # | pH | Solids content, % by weight | Viscosity, cps | Mean Particle size, microns |
|---|---|---|---|---|
| 2 | 6.32 | 41.5 | 110 | 0.166 |
| 3 | 6.40 | 41.6 | 76 | 0.159 |
| 4 | 6.47 | 43.6 | 110 | 0.081 |
| 5 | 6.64 | 41.2 | 82 | 0.134 |
| 6 | 6.35 | 42.3 | 55 | 0.151 |
| 7 | 6.32 | 42.6 | 194 | 0.074 |
| 8 | 6.40 | 39.6 | 450 | 0.247 |
| 9 | 6.34 | 41.9 | 85 | 0.183 |
| 10 | 6.28 | 38.6 | 55 | 3.437 |
| 11 | 6.45 | 39.8 | 145 | 0.132 |

Preparation of UV Soft Touch Formulations and Panels

In a 250 ml beaker, 70 parts of each dispersion were combined with 0.77 parts of Byk-346 and 0.62 parts of Tego Foamex 805 under agitation using a Dispermat CV disperser at 1000 rpm. To the mixing vessel was added (under agitation at 1500 rpm) 25 parts of a matte paste (Acematt TS-100/Disperbyk 190/Water (1/0.4/10)). The solution was mixed for 10 minutes. In a 100 ml beaker, 9.85 parts of deionized water was combined with 6.50 parts of butyl carbitol. This solution was slowly added to the mixing vessel under agitation at 1500 rpm. Irgacure 819-DW (1.5 parts) was added to the mixing vessel under agitation at 500 rpm and the solution was mixed for five minutes to ensure homogeneity. The formulation was filtered into a plastic jar and left to sit overnight to allow for defoaming.

The panels to be coated were cleaned by wiping with a paper towel, which was dampened with a VM & P Naphtha/Isopropanol solution (1:1). The UV-curable coating was then spray-applied to the panels at approximately 4 mils (wet film thickness) using conventional spray techniques, i.e., Binks 2001 ss spray gun at 45 psi. Five panels were coated with each composition.

After spraying, the panels were held at room temperature for 10 minutes and were then baked at 50° C. for 10 minutes to remove any water. The coatings were cured using a HP-6-High Powered Six-Inch UV Lamp System with VPS-3 Power Supply (Fusion UV Systems, Inc). The conveyor belt speed was set at 10 feet per minute and the Mercury vapor bulbs were set at 100% power. This yielded a total dosage of approximately 2700 mJ/cm$^2$.

The panels were then tested for soft touch and chemical resistance. The coatings were tested for softness according to the feel by hand and ranked from one to five, with one being a hard feel and five being a soft feel. The number in Table 3 represents the average of the five panels. The chemical resistance was a methylethyl ketone resistance test. This test was performed using an 8"×8" cheesecloth and a 2-pound ball peen hammer. The dry film thickness of the coating was measured and the coated panel was wiped off with a cloth to remove any loose materials. The coated panel was then placed on a flat surface with the painted side up. The ball peen was securely wrapped with several layers of cloth (8"×8" cloth folded twice). The cloth was secured to the hammer by using a rubber band to insure that the cloth did not come off during test. The cheesecloth was saturated with methylethyl ketone. The wet ball peen was placed on the coated surface, with the hammer being held so that the ball peen was at a 90-degree angle to the panel. Without applying downward pressure, the hammer was moved back and forth over an approximately 4" long area of the coating. One forward and back motion was counted as 1 double rub. The cloth was saturated with MEK after every 25 double rubs. The test was stopped if breakthrough of the coating occurred. A maximum of 200 double rubs would have been conducted if there were no coating failure. Visible cracking was determined to be the evidence of coating failure. The number in Table 3 represents the average of the five panels. The results of both tests were as set forth in Table 3.

TABLE 3

| Dispersion from Example # | Softness | # of double rubs before breakthrough |
|---|---|---|
| 1 | 4.0 | 75 |
| 2 | 3.8 | 87 |
| 3 | 2.6 | 89 |
| 4 | 4.4 | 44 |
| 5 | 3.2 | 64 |
| 6 | 4.8 | 61 |
| 7 | 5.0 | 59 |
| 8 | 3.6 | 77 |
| 9 | 2.2 | 64 |
| 10 | 2.8 | 76 |
| 11 | 4.6 | 91 |

EXAMPLE 12

In a 250 ml beaker, 60 parts of the dispersion of Example 2 were combined with 0.77 parts of Byk-346 and 0.62 parts of Tego Foamex 805 under agitation using a Dispermat CV disperser at 1000 rpm. To the mixing vessel was added (under agitation at 1500 rpm) 20 parts of a matte paste (Acematt OK-412/Disperbyk 190/Water (5/1/25)). The solution was mixed for 10 minutes. In a separate 100 ml beaker, 4.0 parts of the Urethane Acrylate A (described below) were combined with 2.67 parts of butyl carbitol. This solution was slowly added to the 250 ml beaker under agitation at 1500 rpm. A 9% solution of Darocur TPO, Irgacure 819, and Irgacure 651 (1:2:3) in butyl carbitol was prepared in a separate 100 ml beaker. 8.33 parts of this photoinitiator solution were added to the 250 ml beaker under agitation at 500 rpm and the solution was mixed for five minutes to ensure homogeneity. The formulation was filtered into a plastic jar and left to sit overnight to allow for defoaming.

The same process for coating panels was used as in Examples 1 through 11. In addition to softness, the coated panels were also tested for resistance to suntan lotion. The method was a room temperature spot test using "Coppertone for Kids" (SPF 30) suntan lotion. In this internal screening test, a dime-sized spot was applied to the coating. After 1 hr, 2 hrs, 3 hrs, 4 hrs, 6 hrs, and 8 hrs the lotion was removed and the exposed spot was scratched with a wooden applicator stick. The time reported is the last measurement before the coating could be removed with the applicator stick.

Urethane Acrylate A was prepared by reacting 342.26 parts by weight of Desmodur N-3600 (a commercially available product from Bayer Polymers LLC that is a trimerized hexane diisocyanate containing less than 0.25% by weight of monomeric hexane diisocyanate, having an NCO content of about 23% by weight), and 657.74 parts by weight of Tone M 100 (a caprolactone-2-hydroxyethyl acrylate adduct supplied by Dow under the tradename TONE M-10, having the formula:

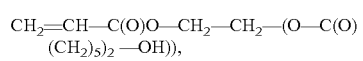

in the presence of 0.01 part by weight of T-12.

The results were as set forth in the following table:

| Coating Resin System | Softness | Suntan Lotion Resistance |
|---|---|---|
| Example 2 | 3.8 | 2 hours |
| Example 12 | 3.6 | 8 hours |

Although the invention has been described in detail in the foregoing for the purpose of illustration, it is to understood that such detail is solely for that purpose and that variations can be made therein by those skilled in the art without departing from the spirit and scope of the invention except as it may be limited by the claims.

What is claimed is:

1. A radiation-curable, aqueous polyurethane emulsion prepared by a process comprising:
   A) reacting
   1) from about 5 to about 45% by weight of an hydroxy group containing, unsaturated polyester acrylate having an OH number of from about 40 to about 200,
   2) from about 5 to about 60% by weight of a polycarbonate diol having an OH number of from about 28 to about 225,
   3) from about 10 to about 20% by weight of a polyether diol having an OH number of from about 28 to about 225, with the proviso that if component 3) is present, the weight ratio of component 2) to component 3) is from about 0.5:1 to about 25:1,
   4) from about 2 to about 8% by weight of a monohydroxy hydrophilic polyether,
   5) from about 1 to about 8% by weight of one or more mono- or difunctional isocyanate-reactive compounds that contain moieties selected from cationic groups, anionic groups, potential cationic groups and potential anionic groups, with
   6) from about 10 to about 30% by weight of one or more diisocyanates and/or polyisocyanates,
   B) optionally converting any potential cationic or anionic groups into cationic or anionic groups by salt formation, and
   C) forming a dispersion of the reaction product of 1), 2), 3), 4), 5) and 6) in water and reacting said dispersion with
   7) from about 0.1 to about 3% by weight of one or more diamines and/or polyamines,
   wherein the weight percents of components 1) through 7) total 100% and the equivalent ratio of the isocyanate groups in component 6) to the sum of the isocyanate-reactive groups in component 1), 2), 3), 4) and 5) is from about 1.2:1 to about 2.0:1.

2. The emulsion of claim 1, wherein components 1) through 7) are reacting in the following amounts:
   component 1) from about 20 to about 30% by weight,
   component 2) from about 30 to about 40% by weight,
   component 3) from about 10 to about 15% by weight,
   component 4) from about 3 to about 5% by weight,
   component 5) from about 2 to about 4% by weight,
   component 6) from about 13 to about 23% by weight and
   component 7) from about 0.5 to about 2% by weight.

3. The emulsion of claim 1, wherein the weight ratio of component 2) to component 3) is from about 3:1 to about 5:1.

4. The emulsion of claim 3, wherein the weight ratio of component 2) to component 3) is from about 3:1 to about 4:1.

5. The emulsion of claim 1, wherein said equivalent ratio is from about 1.4:1 to about 1.6:1.

6. The emulsion of claim 1, wherein the OH number of component 1) is from about 100 to about 200, the OH number of component 2) is from about 28 to about 75 and the OH number of component 3) is from about 28 to about 75.

7. The emulsion of claim 6, wherein the OH number of component 1) is from about 125 to about 180, the OH number of component 2) is from about 35 to about 65 and the OH number of component 3) is from about 35 to about 65.

8. The emulsion of claim 1 further comprising from 0 up to 80% by weight based on the weight of components 1) through 7) of materials selected from the group consisting of acrylate terminated urethanes, arcylate terminated polyesters, acrylate terminated polyethers, acrylate terminated polycarbonates, methacrylate terminated urethanes, metharcylate terminated polyesters, methacrylate terminated polyethers, methacrylate terminated polycarbonates, and mixtures thereof.

9. The emulsion of claim 8 wherein said material is present in an amount of from about 10 to about 15% by weight.

10. The emulsion of claim 1 additionally comprising from about 0.1 to about 10% by weight, based on the weight of components 1) through 7), of one or more photo-initiators.

11. The emulsion of claim 10 wherein said photo-initiator is present in amount of from about 3 to about 7% by weight.

12. The radiation cured coated prepared from the emulsion of claim 1.

13. In a method of prepared a cured coating by applying a coating composition to a substrate and curing the composition by UV radiation, the improvement wherein the composition is the emulsion of claim 10.

14. The product produced by the process of claim 13.

* * * * *